(12) United States Patent
Lee

(10) Patent No.: US 6,199,887 B1
(45) Date of Patent: Mar. 13, 2001

(54) EXTENSION TUBE ASSEMBLY WITH LENGTHENED LIFE FOR A BICYCLE

(76) Inventor: Kuen-Hu Lee, P.O. Box 63-247, Taichung (TW)

( * ) Notice: Subject to any disclaimer, the term of this patent is extended or adjusted under 35 U.S.C. 154(b) by 0 days.

(21) Appl. No.: 09/351,780

(22) Filed: Jul. 12, 1999

(51) Int. Cl.[7] .................................................. B62J 25/00
(52) U.S. Cl. ........................ 280/291; 280/288.4; 74/564
(58) Field of Search ................ 280/288.4, 291; 74/564; 296/75; D12/113, 117, 114

(56) References Cited

U.S. PATENT DOCUMENTS

| | | | |
|---|---|---|---|
| 578,335 | * | 3/1897 | Hughes ................................ 280/291 |
| 615,533 | * | 12/1898 | Demory ............................... 280/291 |
| 618,855 | * | 2/1899 | Ennis et al. ........................... 280/291 |
| 625,368 | * | 5/1899 | Thompson ............................ 280/291 |
| 3,484,829 | * | 12/1969 | Erickson .............................. 280/291 |
| 5,454,580 | * | 10/1995 | Lin ...................................... 280/291 |
| 5,482,307 | * | 1/1996 | Lin ...................................... 280/291 |
| 5,779,254 | * | 7/1998 | James et al. .......................... 280/291 |
| 6,070,897 | * | 6/2000 | Hsieh et al. .......................... 280/291 |

FOREIGN PATENT DOCUMENTS

1012203 * 7/1957 (DE) .................................... 280/291

* cited by examiner

*Primary Examiner*—Daniel G. DePumpo
(74) *Attorney, Agent, or Firm*—Alan Kamrath; Rider Bennett Egan & Arundel, LLP.

(57) ABSTRACT

An extension tube assembly is provided for a bicycle of the type having a hub with an extended member and a fork with an attachment plate. The extension tube assembly includes an extension tube with a polygonal compartment defined in an end thereof and a positioning member formed corresponding to the polygonal compartment and thus fittingly yet releasably received in the polygonal compartment. The extended member of the hub is extended through the attachment plate, the positioning member, and a bottom wall defining the polygonal compartment and then releasably secured by a nut.

13 Claims, 5 Drawing Sheets

EXTENSION TUBE ASSEMBLY WITH LENGTHENED LIFE FOR A BICYCLE

BACKGROUND OF THE INVENTION

1. Field of the Invention

The present invention relates to an extension tube assembly for a bicycle, and more particularly to an extension tube assembly having a positioning device for releasably attaching an extension tube to a bicycle front fork or rear fork, thereby allowing the extension tube to be re-used by means of re-mounting the extension tube to the fork in a different angular position.

2. Description of the Related Art

A typical stunt bicycle generally has a pair of extension tubes attached to both of the front fork and the rear fork for stunt purpose. Each extension tube is provided with an embossed outer periphery for increasing friction when sliding along the top of a rail. Nevertheless, a bottom portion of the embossed outer periphery of the extension tube is worn away quickly. Thus, the whole extension tube must be discarded even though the embossed outer periphery of the extension tube still has a relatively large portion that has not been used yet.

The present invention is intended to provide an improved extension tube that mitigates and/or obviates this problem.

SUMMARY OF THE INVENTION

An extension tube assembly for a bicycle hub in accordance with the present invention comprises an extension tube including an end releasably attached to the bicycle hub, a polygonal compartment being defined in the end of the extension tube; and a positioning member formed corresponding to the polygonal compartment and thus fittingly yet releasably received in the polygonal compartment.

In a preferred embodiment of the invention, an extension tube assembly is provided for a bicycle of the type having a hub with an extended member and a fork with an attachment plate. The extension tube assembly comprises an extension tube with a polygonal compartment defined in a first end thereof and a positioning member formed corresponding to the polygonal compartment and thus fittingly yet releasably received in the polygonal compartment. The extended member of the hub is extended through the attachment plate, the positioning member, and a bottom wall defining the polygonal compartment and then releasably secured by a fastener.

The extended member of the hub may be a threaded stem. The positioning member includes a first hole through which the threaded stem extends, and the bottom wall defining the polygonal compartment includes a second hole through which the threaded stem extends. The fastener is a nut.

The attachment plate includes a slit through which the extended member of the hub extends. The slit includes a relatively larger section through which the extended member of the hub extends and a relatively smaller section. The positioning member includes a protrusion that is sized to be releasably received in the relatively larger section of the slit yet greater than the relatively smaller section of the slit. In an alternative embodiment, the slit includes a relatively larger section through which the extended member of the hub extends, the slit further including a relatively smaller section, the positioning member including a protrusion that is sized to be releasably received in the relatively smaller section of the slit The second end of the extension tube is open-ended through which the fastener is passable for engagement with the extended member of the hub. The extension tube includes an outer periphery that is preferably embossed completely.

It is a primary object of the present invention to provide an extension tube assembly having a positioning device for releasably attaching an extension tube to a bicycle front fork or rear fork, thereby allowing the extension tube to be re-used by means of re-mounting to the fork at a different angular position.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
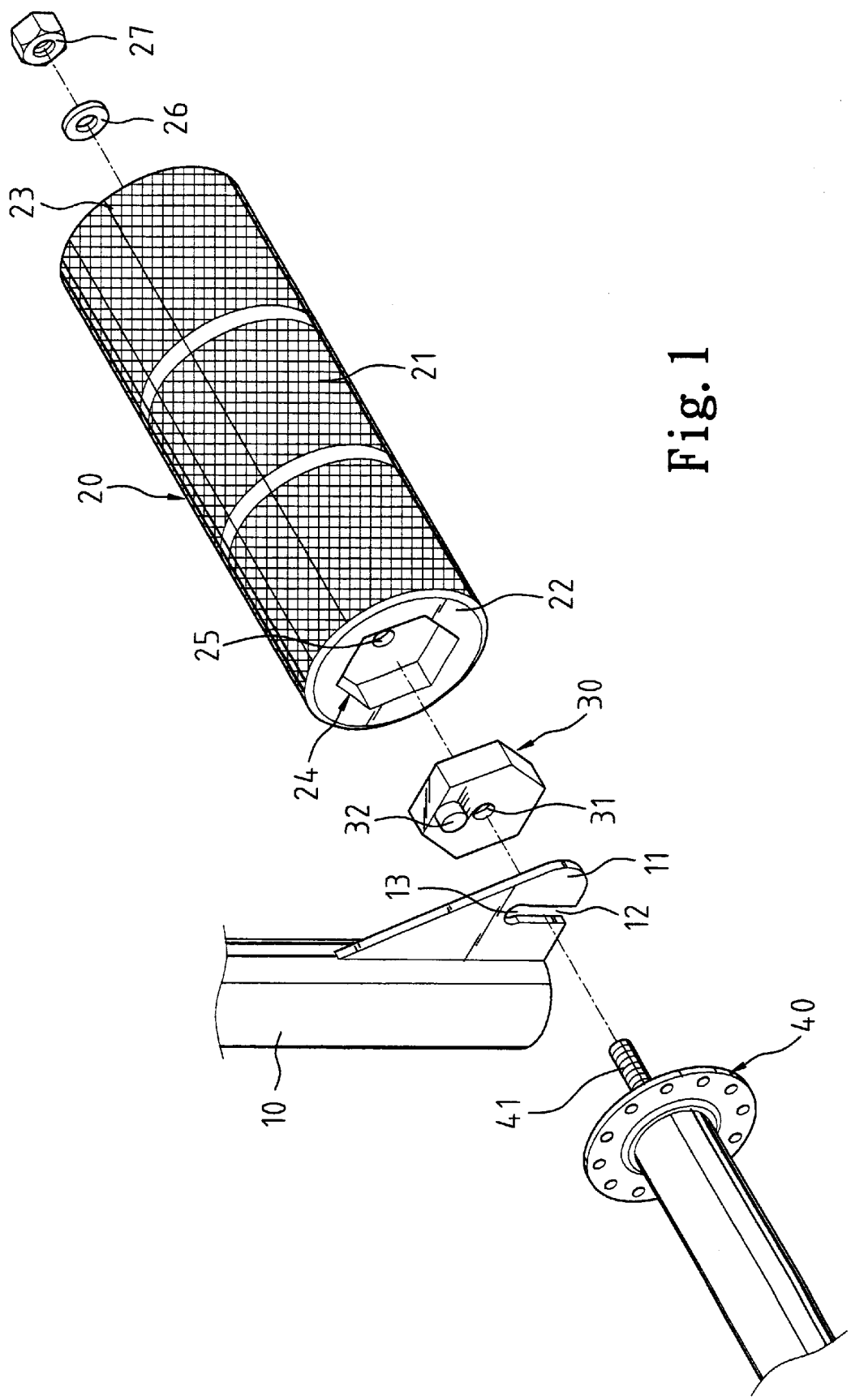
FIG. 1 is an exploded perspective view of an extension tube assembly for a bicycle in accordance with the present invention.
Figure 2:
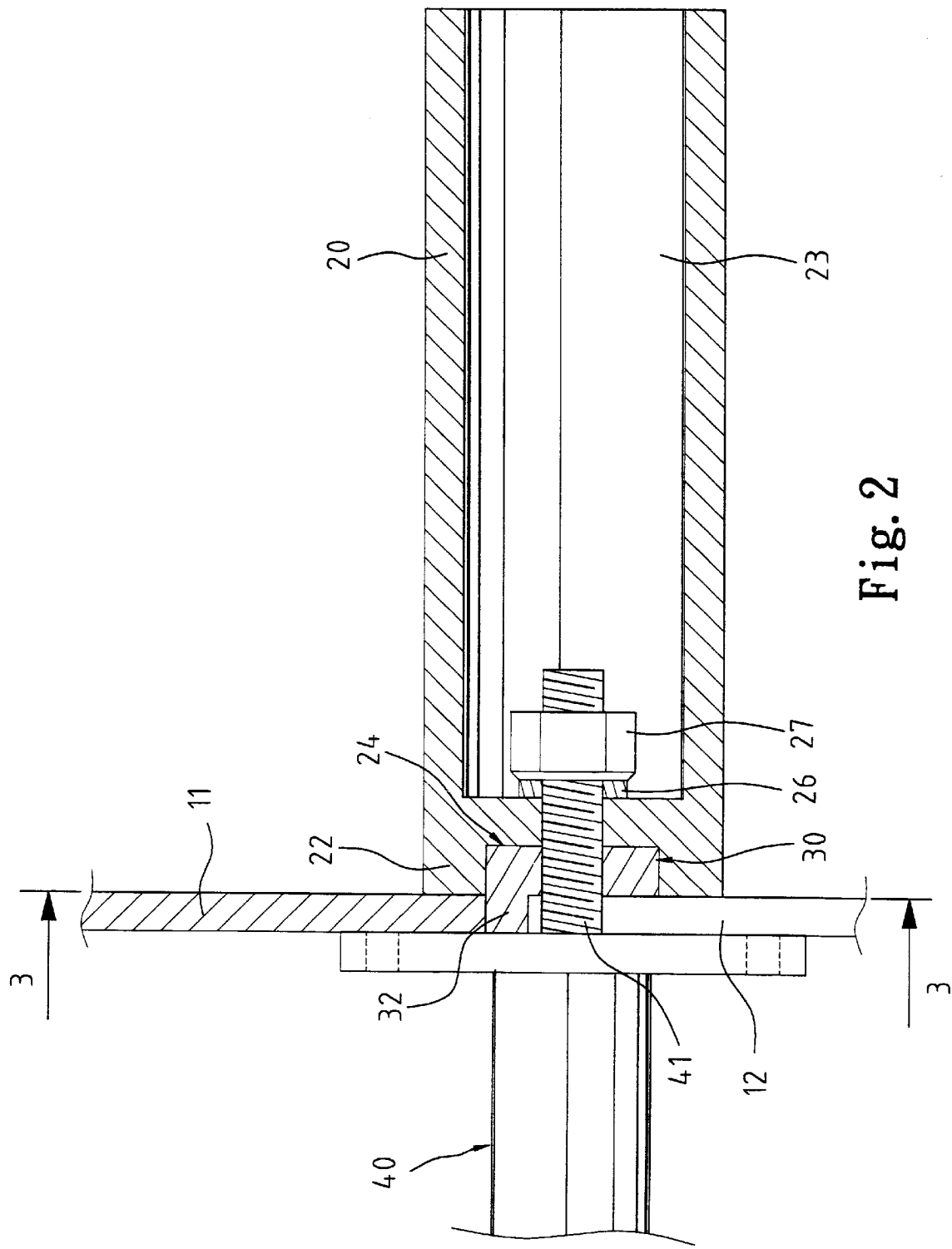
FIG. 2 is a sectional view of the extension tube assembly in accordance with the present invention.

Referring to FIGS. 1 and 2, an extension tube assembly for a bicycle in accordance with the present invention generally includes an extension tube 20 including a first end 22 and a second end 23 that is open-ended. A polygonal compartment 24 is defined in the first end 22 of the extension tube 22. The polygonal compartment 24 may be triangular, tetragonal, pentagonal, hexagonal, etc. A screw hole 25 is defined in a bottom wall that defines the polygonal compartment 24.

A positioning member 30 is formed corresponding to the polygonal compartment 25 and thus fittingly yet releasably received in the polygonal compartment 25. The extension tube 20 is attached to an attachment plate 11 of a bicycle front fork or rear fork 10. The extension tube 20 includes an outer periphery 21 that is preferably completely embossed. In assembly, an extended member (e.g., a threaded stem 41) of a hub 40 is extended through a slit 12 defined in the attachment plate 11, a hole 31 in the positioning member 30, and the hole 25 in the first end 22 of the extension tube 20, and a washer 26 and a nut 27 are mounted to the threaded stem 41 via the open-ended second end 23, best shown in FIG. 2.

Figure 5:
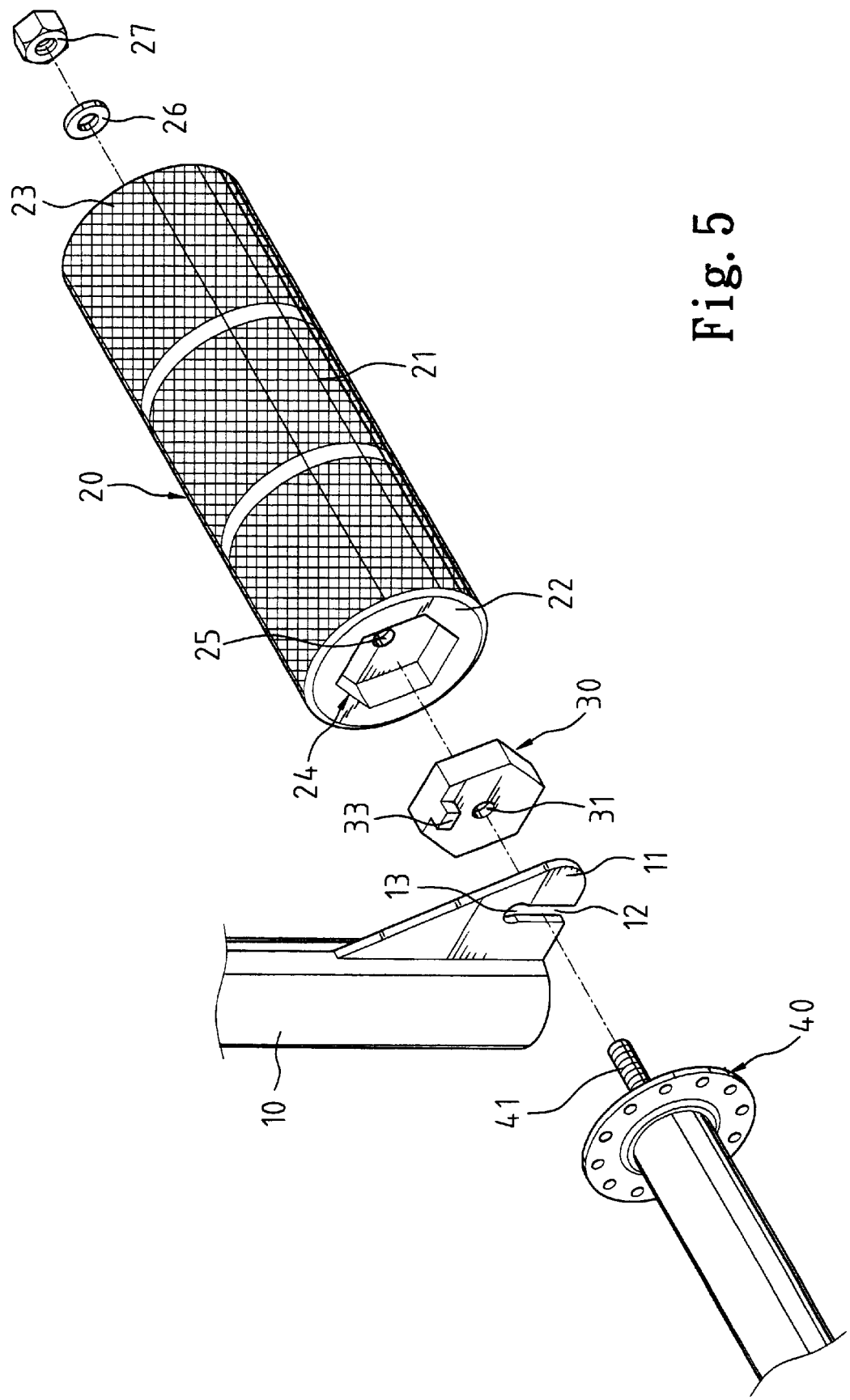
FIG. 5 is an exploded perspective view illustrating a modified embodiment of the extension tube assembly.

The slit 12 may include a relatively larger section 13 extended from a relatively smaller section (not labeled) thereof. The positioning member 30 includes a protrusion 32 that is sized to be releasably received in the relatively larger section 13 of the slit 12 yet greater than the relatively smaller section of the slit 12. The protrusion may be circular (FIG. 1) or rectangular (see reference numeral 33 in FIG. 5). This provides an additional positioning effect for the extension tube 20.

Figure 3:
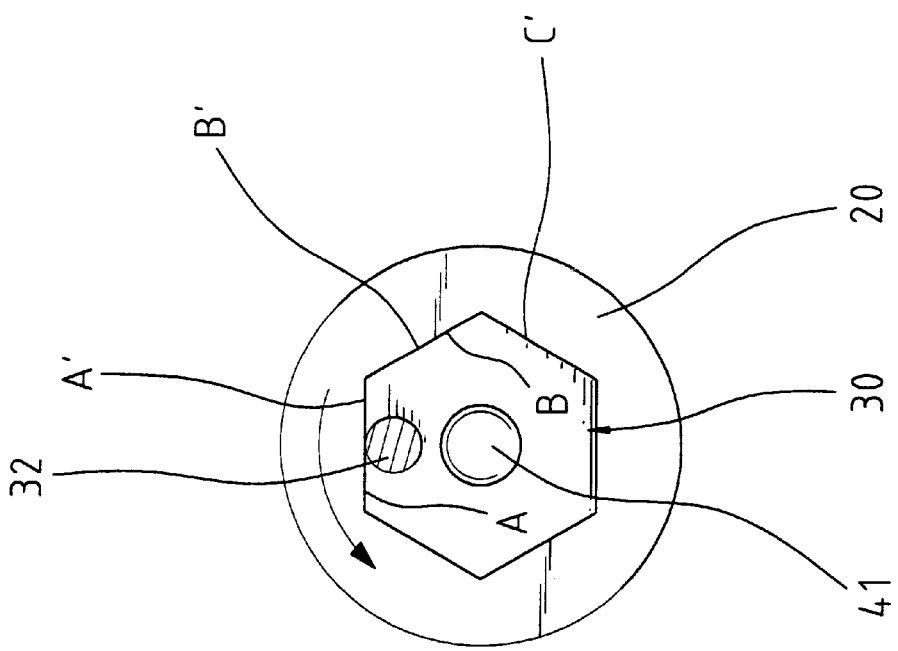
FIG. 3 is a sectional view taken along line 3—3 in FIG. 2.
Figure 4:
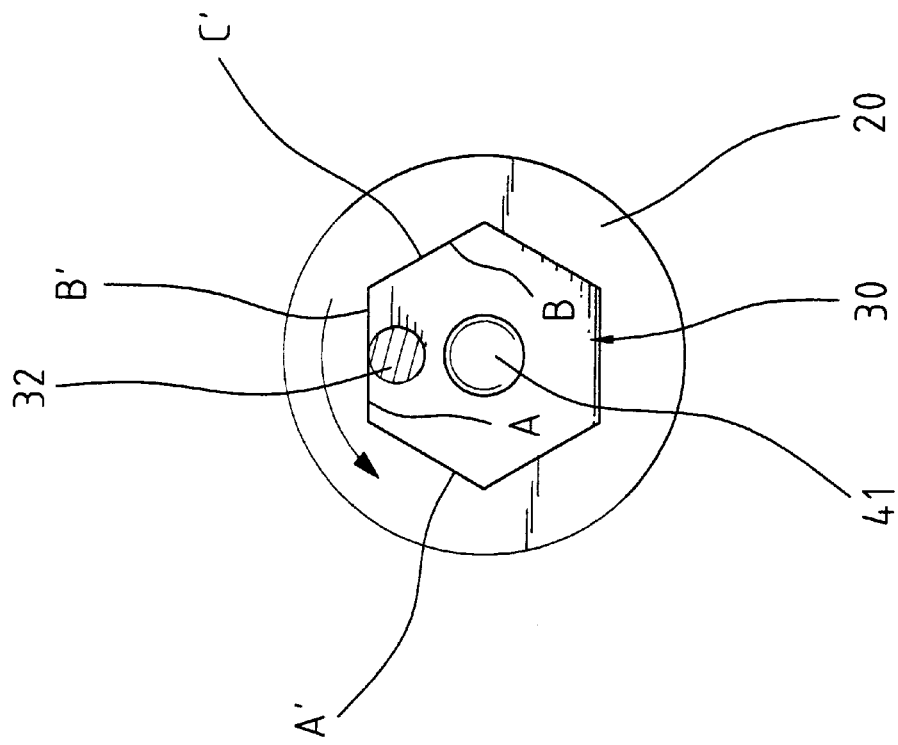
FIG. 4 is a view similar to FIG. 3, wherein the extension tube is mounted in a different angular position relative to the hub.

Referring to FIG. 3, the polygonal positioning member 30 and the polygonal compartment 24 are engaging in a manner that face A and face B of the positioning member 30 engage with face A' and face B' of the polygonal compartment 24, respectively. When the bottom portion of the embossed outer periphery is worn away, the user may firstly disengage and detach all of the members and then turning the extension tube 20 through an angle (60° for an extension tube 20 having a hexagonal compartment 24) relative to the hub 40. The positioning member 30 is inserted into the compartment 24 in a manner that face A and face B of the positioning member 30 now engage with face B' and face C' of the polygonal compartment 24, respectively, best shown in FIG. 4. Next, all of the members are assembled to a status shown in FIG. 2. Thus, the extension tube 20 may be used again for stunt purpose or for a passenger to step on. The maximum life for the extension tube 20 is several times (six times in this embodiment) of that of a conventional extension tube.

Figure 6:
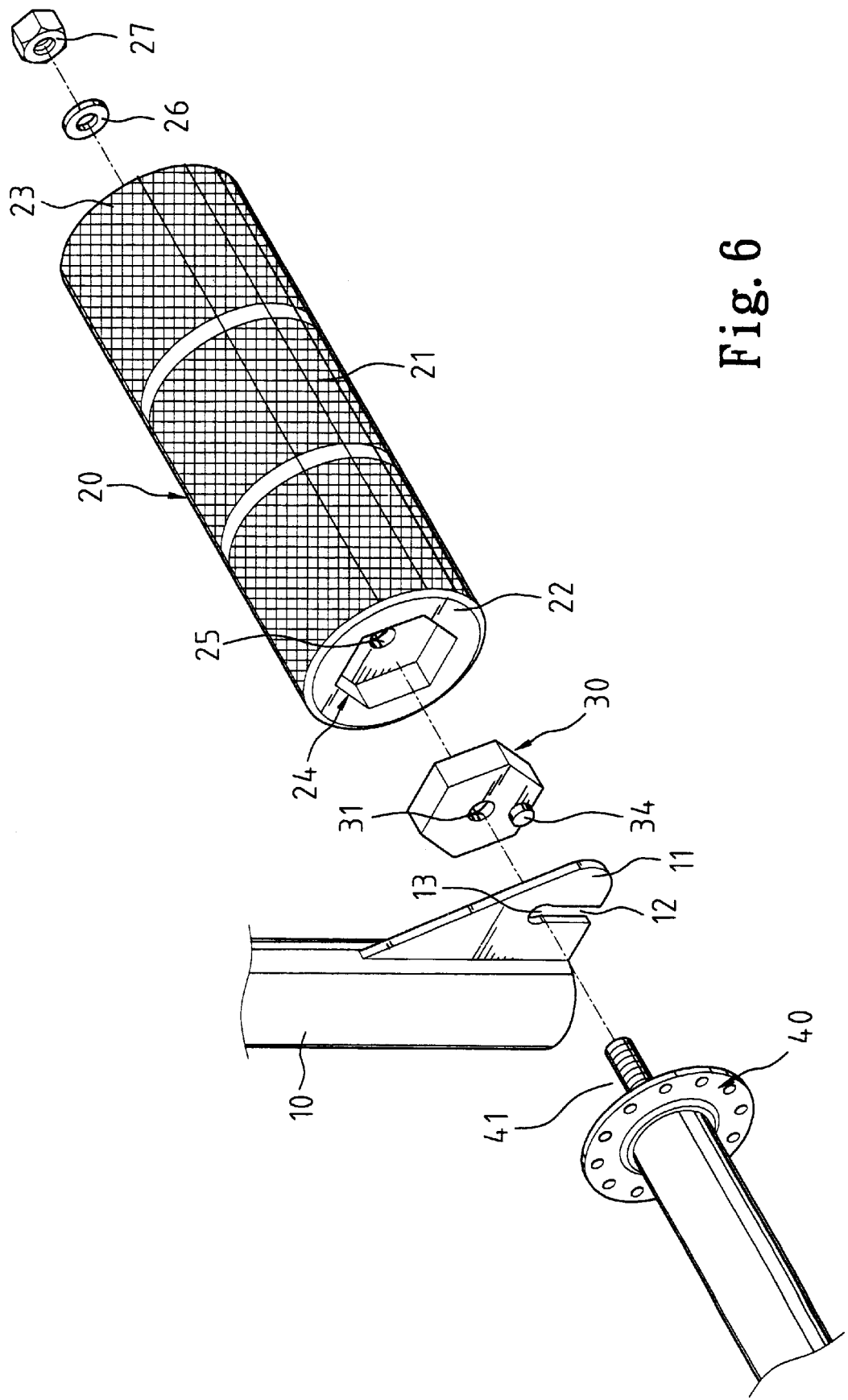
FIG. 6 is an exploded perspective view illustrating a further modified embodiment of the extension tube assembly.

FIG. 6 illustrates a modified embodiment of the extension tube assembly in accordance with the present invention, wherein the slit 12 includes a relatively larger section 13 through which the threaded stem 41 of the hub 40 extends. The positioning member 30 including a protrusion 34 that is sized to be releasably received in the relatively smaller section (not labeled) of the slit 12.

According to the above description, it is appreciated that the extension tube 20 is reliably positioned in place as a result of double retaining effect and has lengthened life. In addition, the extension tube 20 may be integrally formed without any modification to thereby reduce the manufacture cost.

Although the invention has been explained in relation to its preferred embodiment, it is to be understood that many other possible modifications and variations can be made without departing from the spirit and scope of the invention as hereinafter claimed.

What is claimed is:

1. An extension tube assembly for a bicycle having a hub with an extended member and having a fork with an attachment plate through which the extended member extends, comprising:
   an extension tube including a first end and a second end, a polygonal compartment being defined in the first end of the extension tube;
   a positioning member formed corresponding to the polygonal compartment and thus fittingly yet releasably received in the polygonal compartment and adapted to removably abut with the attachment plate of the fork; and
   a fastener for abutment with the extension tube opposite to the positioning member;
   wherein the positioning member, a bottom wall defining the polygonal compartment, and the fastener are adapted so that the extended member of the hub extended through the attachment plate can be extended through the positioning member and the bottom wall defining the polygonal compartment and then releasably secured by the fastener.

2. The extension tube assembly as claimed in claim 1, wherein the extended member of the hub is a threaded stem, the positioning member includes a first hole through which the threaded stem extends, and the bottom wall defining the polygonal compartment includes a second hole through which the threaded stem extends.

3. The extension tube assembly as claimed in claim 2, wherein the fastener includes a nut.

4. The extension tube assembly as claimed in claim 1, wherein the second end of the extension tube is open-ended through which the fastener is passable for engagement with the extended member of the hub.

5. The extension tube assembly as claimed in claim 1, wherein the extension tube includes an embossed outer periphery.

6. The extension tube assembly as claimed in claim 5, wherein the outer periphery of the extension tube is completely embossed.

7. An extension tube assembly for a bicycle having a hub with an extended member and having a fork with an attachment plate including a slit through which the extended member of the hub extends, comprising:
   an extension tube including a first end and a second end, a polygonal compartment being defined in the first end of the extension tube;
   a positioning member formed corresponding to the polygonal compartment and thus fittingly yet releasably received in the polygonal compartment; and
   a fastener;
   wherein the positioning member, a bottom wall defining the polygonal compartment and the fastener are adapted so that the extended member of the hub extended through the attachment plate can be extended through the positioning member and the bottom wall defining the polygonal compartment and then releasably secured by the fastener.

8. The extension tube assembly as claimed in claim 7, wherein the slit includes a relatively larger section through which the extended member of the hub extends and a relatively smaller section, and the positioning member includes a protrusion that is sized to be releasably received in the relatively larger section of the slit yet greater than the relatively smaller section of the slit.

9. The extension tube assembly as claimed in claim 7, wherein the slit includes a relatively larger section through which the extended member of the hub extends, the slit further including a relatively smaller section, the positioning member including a protrusion that is sized to be releasably received in the relatively smaller section of the slit.

10. The extension tube assembly as claimed in claim 7, wherein the fastener includes a nut.

11. The extension tube assembly as claimed in claim 7, wherein the second end of the extension tube is open-ended through which the fastener is passable for engagement with the extended member of the hub.

12. The extension tube assembly as claimed in claim 7, wherein the extension tube includes an embossed outer periphery.

13. The extension tube assembly as claimed in claim 11, wherein the outer periphery of the extension tube is completely embossed.

* * * * *